United States Patent [19]

Smith

[11] Patent Number: 5,970,820
[45] Date of Patent: Oct. 26, 1999

[54] SERIES LINKAGE AUTO-BALANCE ROTOR HUB

[75] Inventor: Damon Carlton Smith, League City, Tex.

[73] Assignee: Lockheed Martin Corp., Houston, Tex.

[21] Appl. No.: 09/061,992

[22] Filed: Apr. 17, 1998

[51] Int. Cl.[6] .................. F16C 3/00; F16F 15/22
[52] U.S. Cl. ............... 74/573 R; 74/572; 74/574; 464/180
[58] Field of Search ................... 74/573 R, 572, 74/573 F, 574; 464/180, 24; 242/612, 597.5; 57/135

[56] References Cited

U.S. PATENT DOCUMENTS

| | | | |
|---|---|---|---|
| 2,659,243 | 11/1953 | Darrieus | 74/573 F |
| 2,778,243 | 1/1957 | Darrieus | 74/573 F |
| 4,043,431 | 8/1977 | Ellege | 74/574 X |
| 4,432,253 | 2/1984 | Kerlin | 74/573 R |
| 4,504,244 | 3/1985 | Wolf et al. | 464/83 |
| 5,666,862 | 9/1997 | Eckel et al. | 74/574 |
| 5,819,598 | 10/1998 | Cooke et al. | 74/574 |
| 5,860,865 | 1/1999 | Smith | 464/180 |

FOREIGN PATENT DOCUMENTS 62-194053  8/1987  Japan .................. 74/573 R

*Primary Examiner*—Vinh T. Luong
*Attorney, Agent, or Firm*—W. H. Meise; L. L. Sharrar

[57] ABSTRACT

A self-contained automatic balancing device or system for use with machines in which a load mass (such as a flywheel or bobbin) is attached to and rotates with a rotating shaft or rotor, and in which the automatic balancing device uses a set of tubes and linkages set in series-connected arrangement for containment of balancing masses within the tubes. The balancing apparatus is situated in mechanical series between the shaft and the rotated mass so that it comprises a hub, is operated into balance by the rotation of the shaft and hub themselves, without need for pneumatic, electric or other energy inputs.

9 Claims, 1 Drawing Sheet

U.S. Patent      Oct. 26, 1999      5,970,820
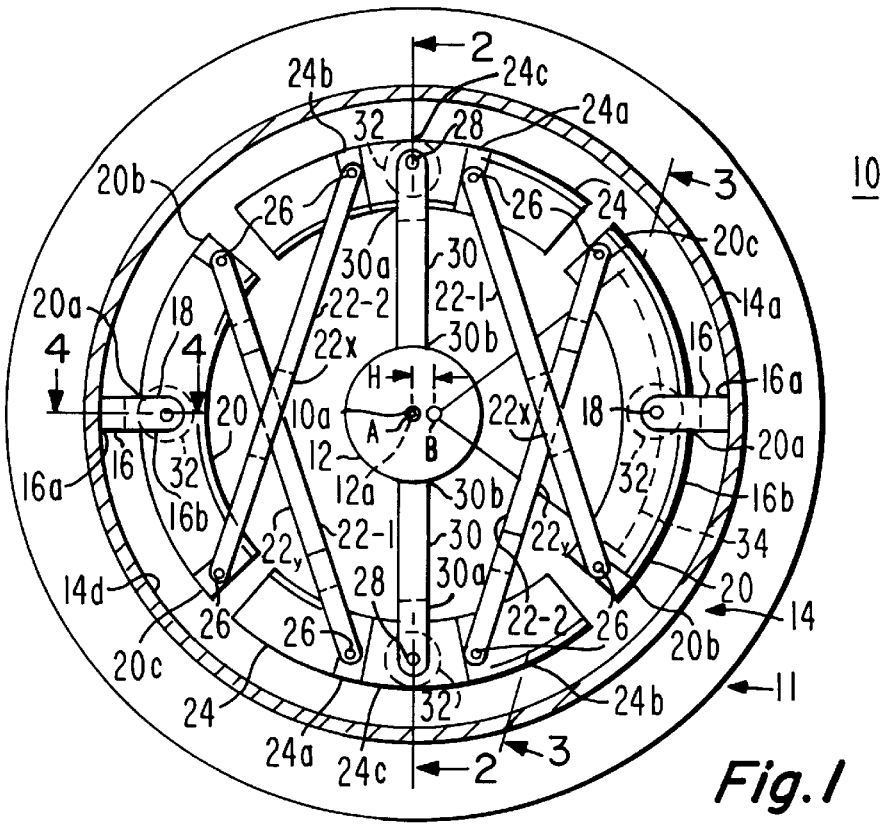
*Fig. 1*
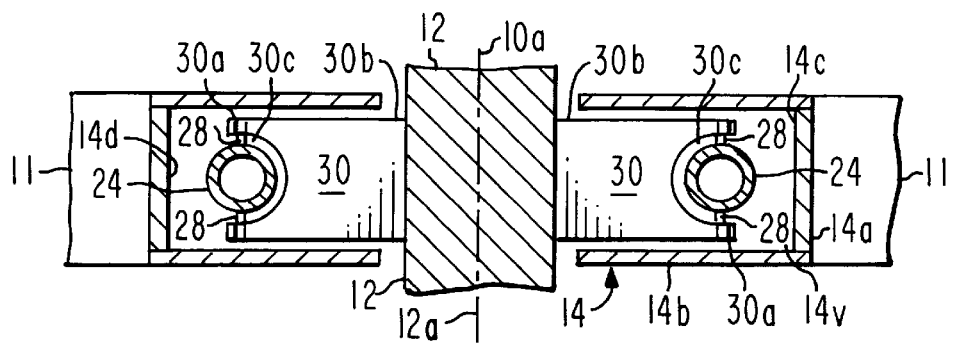
*Fig. 2*
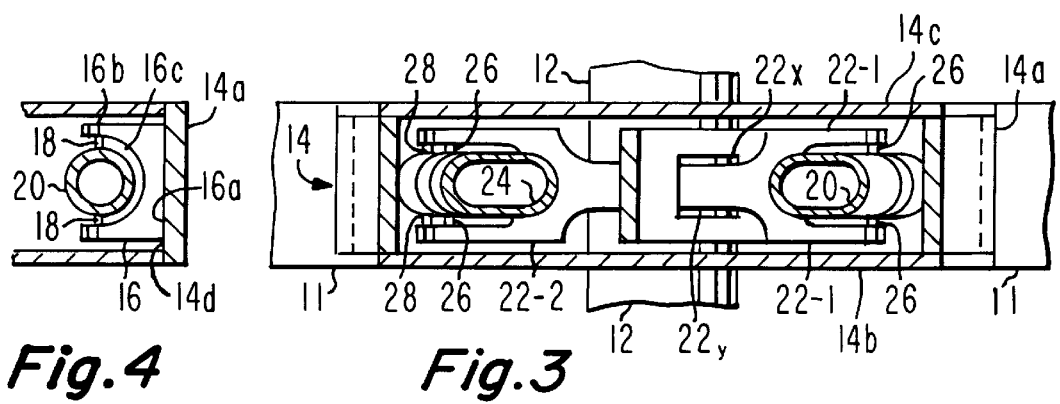
*Fig. 4*      *Fig. 3*

SERIES LINKAGE AUTO-BALANCE ROTOR HUB

FIELD OF THE INVENTION

This invention relates to automatic balancing arrangements for rotating shafts and devices and, more particularly, to an automatic balancing system in which the balancing components are in a linked serial configuration.

BACKGROUND OF THE INVENTION

The use of high speed rotating machinery is very important in modern industry; often, maximum operating speed is limited by the onset of serious vibrations caused by an imbalance of the rotoring portion of a machine. If the machine is operating at a rotational speed well below the first flexural critical speed of the rotor shaft, the shaft can be considered to be stiff, in which case the imbalance can be described as a displacement and/or misalignment of the principal axis of inertia of the rotating mass relative to the axis of rotation. This imbalance is the result of unequal mass distribution about the axis of rotation. At higher rotation speeds, shaft deformation becomes a factor, and the shaft must be considered as being flexible. The balancing procedure in the flexible-shaft situation is termed flexible-rotor balancing or "modal balancing". Balancing of either rigid or flexible rotors is accomplished by the placement of compensating balance masses along or about the rotor. The size and placement of these balance masses is usually determined by testing the rotor using a balancing machine, as described in chapter 39 of "Shock & Vibration Handbook, Third Edition" (1988), edited by Cyril M. Harris, published by McGraw-Hill Book Company, New York. Manual balancing is effective in dealing with rigid rotor vibrations, but is relatively ineffective in dealing with flexible rotor vibrations, because a destabilizing positive feedback process becomes dominant in determining rotor dynamics when the rotor operates at speeds which cause significant shaft flexure; a very small initial imbalance becomes magnified in the flexible-rotor case because the shaft deforms in response to the net centrifugal force, and the deformation causes additional imbalance. This positive feedback process cannot be influenced by manual balancing, because manual balancing affects only the initial mass distribution and cannot respond to shaft flexure. On the other hand, automatic balancing, which is a control process, provides negative feedback which can compensate for the destabilizing effects of the positive feedback attributable to shaft flexure. With automatic balancing, the rotor can be operated at significantly higher speeds, and with less bearing wear, than without automatic balancing.

However, prior art automatic balance systems are costly and complex. A prior art automatic balancing system might require electronic sensors to detect the imbalance, analog and/or digital electronic circuitry to process the imbalance input signals, and actuators to reposition the balance masses as required to implement the control effect. Improved automatic balancing systems are desired. One such system was disclosed and claimed in my prior U.S. patent application Ser. No. 08/635,076, filed on Apr. 19, 1996 and entitled "Pneumatically Driven Auto-balance Rotor Hub", now U.S. Pat. No. 5,860,865 issued on Jan. 19, 1999, which is incorporated herein in its entirety by reference. Provision of other auto-balance rotor hub arrangements are still desirable to provide automatic balancing of various types of rotated equipment, such as a turbine, propeller, yarn bobbin, flywheel, helicopter blades and the like.

BRIEF SUMMARY OF THE INVENTION

In accordance with the invention, a self-contained automatic balancing device or system for use with machines in which a load mass (such as a flywheel or bobbin) is attached to and rotates with a rotating shaft or rotor, and in which the automatic balancing device may be mounted principally on the rotating mass, or be situated in mechanical series between the shaft and the rotated mass so that it comprises a hub, is operated into balance by the rotation of the shaft and hub themselves, without need for pneumatic, electric or other energy inputs.

More particularly, according to one aspect of the invention, an automatic balance arrangement includes a rotating mass, such as a flywheel, which rotates about an axis of rotation of a shaft. The rotated mass is flexibly affixed to the shaft through a system of circular tubes and linkage arms, with a set of circular balance masses being mounted in the tubes. The plurality of masses are circumferentially spaced about and mounted in the rotated tubes. The weights are arranged for circumferential motion relative to the rotated mass, whereby the rotated mass tends to be balanced and vibration reduced.

Accordingly, it is one object of the present invention to provide novel auto-balanced rotor hubs having a series linkage arrangement.

This and other objects of the present invention will become apparent to those skilled in the art upon reading the following detailed description of a presently preferred embodiment, when considered in conjunction with the associated drawings, in which like elements have like numerical designations.

BRIEF DESCRIPTION OF THE DRAWINGS

FIG. 1 is a sectional view through the auto-balance hub and the rotated apparatus, in a plane substantially perpendicular to the axis of rotation thereof;

FIG. 2 is a partial diametric sectional view through the apparatus, taken along line 2—2 of FIG. 1;

FIG. 3 is a partial off-axis sectional view through the apparatus, taken along line 3—3 of FIG. 1; and FIG. 4 is a partial sectional view of a tube-mounting bracket and stud, and useful in understanding the mounting arrangement.

DESCRIPTION OF THE INVENTION

Referring to all of the Figures, a rotated equipment assembly 10 is shown with a rotated load 11, as a flywheel and the like. Flywheel 11 is connected to a central drive shaft 12 by auto-balance rotor hub 14, which has a substantially cylindrical radial housing sidewall 14a to which the flywheel is attached; a lower housing plate 14b and an upper housing plate 14c and the interior sidewall surface 14d define and enclose a central hub volume 14V. The top plate 14c and the bottom plate 14b are NOT directly connected to the drive shaft 12. Shaft 12 has an axis of rotation 12a, which is to be made to lie along the apparatus axis of rotation 10a, even if flywheel 12, which initially presents a substantially balanced load to the shaft, becomes unbalanced for some reason. The flywheel 11, hub 14 and shaft 12 rotate as a unit and can be described as a rotating system.

Each of a plurality, e.g. two, of mounting brackets 16 (see especially FIG. 4) has a first end 16a fastened to the housing sidewall interior surface 14d, and has a second end 16b in which a concave formation 16c is formed, to allow passage of, and retention by a stud 18, of a midportion 20a of an associated circular tube 20. Thus, each of a plurality of circular tubes 20 are connected by mounting studs 18 and brackets 16 to the hub housing sidewall 14a and thus to the flywheel load 11.

A linkage arm 22 cross-connects each tube 20 to one point on each of two other circular tubes 24. A first location 20b on each of tubes 20, adjacent to an end of the tube, is connected by one linkage arm 22-1 to a first location 24a on the tube 24 next occurring in a selected direction of rotation (e.g., CCW) around a circle of tubes 20 and 24; a second location 20c on each tube 20, adjacent to an opposite end of that tube, is connected by another linkage arm 22-2 to a another location 24b on the tube 24 next occurring in the opposite direction of rotation (e.g., CW) around the tube circle. In either case, the connection location on the other (destination) tube 24 will be adjacent the end thereof closest to the originating tube 20. Each end of a linkage arm 22 is attached by a pin 26 to the exterior surface of the associated tube 20 or 24, in a manner such that the pin 26 does not restrict rotational freedom of the linkage arms in the plane of FIG. 1, i.e. in the plane which is perpendicular to the axis of drive shaft 12 rotation. Note that the individual linkage arms 22 are not connected one to the other, having suitable portions formed with apertures 22x or reduced width 22y to allow passage of one with respect to the other, and are attached only to the circular tubes 20 and 24.

Each of the like-plurality, e.g. two, of circular tubes 24 is connected substantially at its midpoint 24c by a mounting stud 28 into a first end 30a (and within a suitable concave formation 30c) of associated one of another like-plurality of brackets 30, the opposite end 30b of each bracket is fastened to drive shaft 12.

Each of circular tubes 20 and 24 contains a balance mass 32, which is illustratively shown as a spherical ball, which mass is free to roll within the circular tube. In one embodiment, these balls are made of steel. The circular tubes may or may not contain fluid to slow the rate of movement of the balls within the tubes. It should be understood that: other shapes of the balance masses may used (e.g. the masses may be cylindrical members) and the companion tubes may have channels of shape and dimension sufficient to allow rolling of the members along an arc which lies about the tube's radius of curvature; and the number T of tubes, each with an associated mass, and the number L of linkage arms, will be T=L=2N, where N is greater than one, and each tube will be cross-connected to the nearest two adjacent tubes by two linkage arms (one connected to the nearest CCW tube and the other to the nearest CW tube). It will also be understood that, if N is more than 2, then each of the N brackets 16 will be attached to sidewall interior surface 14d at an angle of about 360°/N; each tube 20 or 24 will have a balance mass 32 and each tube will subtend an angle of somewhat less than 360°/2N; each of N brackets 30 will be mounted on shaft 12, at an angle of about 360°/N and will connect shaft 12 to one of N studs 28 mounted on an associated one of N tubes 24, each still having only two linkage arms connected thereto. No matter how many tubes are used, the connection pathway (load path) from the load 11 (flywheel) to the drive shaft 12 is: from the flywheel 11 to the rotor hub outer housing 14a, thence through brackets 16 and mounting studs 18 to first circular tubes 20, thence through pins 26 to linkage arms 22 and through pins 26 to circular tubes 24, then through mounting studs 28 and brackets 30 to drive shaft 12.

In FIG. 1, the balls 32 are shown in their neutral or centered position, which is the position of equilibrium in response to the centrifugal force acting on the balls when no torque is applied to mounting studs 18 and 28. The dashed circular line 34 running along the entire length of the tube is that line traced by the center of the ball as it rolls within the circular tube; the center of curvature for this dashed line 34 is located at point B and the radius of curvature of the circular path 34, taken by each ball within its circular tube, is slightly less than the distance between the center of the ball and the center A of drive shaft rotation. This relationship applies to each and all of the circular tubes and is illustrated for the circular tube 20 on the right side of FIG. 1. The center 12a of drive shaft 12 rotation is point A. The distance between point A and tube centerpoint B is an offset distance H, which can be of any non-zero magnitude; thus, distance H may be as shown, or may be, if desired, much smaller— for example, this distance H can be as small as 0.001 inch. As long as the offset is positive, i.e. point B is closer than point A to the tube 20/24 involved, the system will be stable. This small distance H causes the equilibrium ball 32 position within the circular tube 20, as determined by the centrifugal force acting on the ball, to be very sensitive to an angle change of the circular tube 20 relative to the housing sidewall 14a, due to torsion of the mounting stud 18. Considering the overall auto-balance response, if the load (flywheel 11) is imbalanced, such that a net centrifugal force acts on the load/flywheel, that net centrifugal force will, depending on the angle of the net centrifugal force vector relative to each circular tube 20, apply a certain amount of torque to mounting studs 18 and, through linkage arms 22, to mounting studs 28. This causes a slight angle change of the circular tubes 20 and 24 relative to the hub housing sidewall 14a, thereby shifting the balls 32 within their circular tubes 20 and 24, in the direction tending to reduce the imbalance of the overall system comprised of the load (flywheel) 11, auto-balance rotor hub 14 and drive shaft 12.

In this embodiment, the lateral rigidity of hub 14 (i.e., the stiffness opposing translation of load/flywheel 11 relative to drive shaft 12 in the plane perpendicular to drive shaft axis-of-rotation 12a) is designed to be greater than the lateral stiffness of drive shaft 12 itself, to prevent a significant reduction in the critical rotational speed of the system due to presence of hub 14.

This "series linkage" auto-balance rotor hub, in which two separate mass shifting mechanisms (the circular tubes with balance masses) are placed functionally in mechanical series between the flywheel and the drive shaft with the load path passing through both mass shifting mechanisms (e.g. with linkage arms 22 connecting circular tubes 20 and 24, between load 11 and drive shaft 12), can be implemented using other shapes, materials and geometric relationships than are shown in the presently preferred embodiment illustrated in FIG. 1. For example, other embodiments of the invention include those in which the circular tubes 20 and 24 are not circular but rather are curved in another shape which facilitates the auto-balance shift of the balls due to torsion of the mounting studs. Also, while FIG. 1 shows one ball in each circular tube, each tube can contain more than one ball. Also, the curved tube can be in a shape other than tubular, to contain one or more balance masses in the shape of a rod instead of balls. Also, the balance masses can be made of a material other than steel.

It should be understood that, while linkage arms 22 are shown in FIGS. 1 and 3 as being connected to circular tubes 20 and 24 by pins 26 which allow rotational freedom in the plane of FIG. 1, i.e. in the plane perpendicular to the drive shaft axis of rotation 12a, the invention can be implemented using other means of attachment of linkage arms 22 to circular tubes 20/24. For example, linkage arms 22 can be bolted to the circular tubes if linkage arms 22 have adequate bending flexibility, in the plane perpendicular to the axis of drive shaft rotation, to allow the net centrifugal force vector (due to load/flywheel imbalance) to apply adequate torsion to the mounting studs 18 and 28 so as to implement the auto-balance shift of the balancing masses 32.

Discussion of Hub Operation Above the First Critical Rotational Speed:

As has been previously stated hereinabove, the lateral rigidity of the auto-balance hub assembly 14 (which is the stiffness opposing translation of load/flywheel 11 relative to drive shaft 12 in the plane perpendicular to the axis of drive shaft rotation) can be greater than the lateral stiffness of drive shaft 12 itself. It should be understood that the foregoing condition is not meant to exclude an embodiment of the invention in which the lateral rigidity (stiffness) of the auto-balance hub assembly 14 is not greater than the lateral stiffness of drive shaft 12, with the low lateral stiffness of hub 14 being due to low torsional (rotational) stiffness of the mounting studs 18 and/or 28 which hold tubes 20 and/or 24. For example, the low lateral stiffness of hub 14 due to low torsional stiffness of the mounting studs can be an order of magnitude (e.g. 1/10) smaller than the lateral stiffness of drive shaft 12; in this mode of operation the rotating system 10 is operated at rotational speeds above the first critical rotational speed of the system. The low torsional stiffness of the mounting studs 18 and 28 allows extremely high sensitivity of the auto-balance mass shifting response to load (flywheel) imbalance. This is because the torque applied to studs 18 and 28 due to the flywheel/load 11 imbalance produces more torsion of the studs and thus a larger angle change of tubes 20 and/or 24 relative to the hub housing 14a. In fact, this embodiment allows for effective auto-balance action over a much broader range of rotational speeds as compared to the embodiment which is designed to operate at rotational speeds below the first critical rotational speed of the system. Linkage arms 22 should be attached to the circular tubes 24 and 20 with adequate rotational flexibility in the plane perpendicular to the axis of drive shaft 12 rotation, to permit the desired low level of lateral rigidity of the hub 14 due to low torsional stiffness of mounting studs 28 and 18. Furthermore, in this mode of operation, the H dimension can be selected to be much larger than in the case where the hub is designed to operate at rotational speeds below the first critical rotational speed of the rotating system. Note that this low lateral stiffness due to low rotational stiffness of the mounting studs applies only to the case where lateral shifting of the flywheel/load 11 relative to the shaft 12 is allowed by the rotation of tubes 20/24 relative to hub housing sidewall 14a. Generally, the rotation of the circular tubes relative to the hub housing is limited to a small angle by mechanical restraints. Therefore, the range of lateral shifting of the load/flywheel 11 relative to drive shaft 12 for which the low lateral stiffness applies is limited. Furthermore, the low torsional stiffness mounting studs and associated mechanism can be protected from excessive force by one or more mechanical constraints which introduce parallel load paths around the sensitive auto-balance mechanism when the load exceeds the operational range. One embodiment of a protective mechanical constraint is accomplished by specifying that the annular gap between the hub housing top plate 14c and shaft 12, and the annular gap between the hub housing bottom plate 14b and shaft 12, be no larger than required to allow the auto-balance mechanism to operate. For example, these annular gaps can be as small as one hundredth of an inch (0.01 inch) or smaller.

While a presently preferred embodiment and several variations thereof have been described by way of example, many other modifications and variations of my novel auto0-balancing rotor hub will now become apparent to those skilled in the art. It is my intent, therefore, to be limited only by the scope of the appending claims and not by the details and instrumentalities described for the examples set forth hereinabove.

What is claimed is:

1. Automatic balancing apparatus for series connection between a driven shaft and a load mass driven into rotation about said shaft, comprising:

a hub rigidly attached to said load;

a plurality N of first curved tubes circumferentially arranged substantially about said shaft, each pivotably connected to said hub at a different point thereon;

a plurality N of second curved tubes circumferentially arranged substantially about said shaft, each interspersed between an associated different pair of said first tubes and pivotably connected to said hub at a different point thereon;

a plurality 2N of linkage arms, each pivotally connected between a different pair of one of said first tubes and one of said second tubes;

at least one balance mass located in each of said first and second tubes and arranged for circumferential motion relative to the rotating load mass so as to operate into balance the combination of shaft, load and autobalancing apparatus substantially solely by rotation of the combination.

2. The apparatus of claim 1, wherein each balance mass is arranged to freely roll with the tube in which that balance mass is located.

3. The apparatus of claim 2, wherein the balance mass has a substantially spherical shape.

4. The apparatus of claim 1, wherein the balance mass has a substantially cylindrical shape.

5. The apparatus of claim 1, wherein said hub has a sidewall disposed generally symmetrically about said drive shaft axis of rotation, and in attachment to said load.

6. The apparatus of claim 1, wherein each first tube is connected to said hub at a location approximately spaced 360°/N from each other first tube connection location.

7. The apparatus of claim 6, wherein the first tube connection location is substantially midway between opposite ends of that tube.

8. The apparatus of claim 1, wherein each second tube is connected to said shaft at a location approximately spaced 360°/N from each other second tube connection location on said shaft.

9. The apparatus of claim 8, wherein the first tube connection location is substantially midway between opposite ends of that tube.

* * * * *